US012518400B2

(12) United States Patent
Itsumi et al.

(10) Patent No.: US 12,518,400 B2
(45) Date of Patent: Jan. 6, 2026

(54) INFORMATION PROCESSING DEVICE, INFORMATION PROCESSING SYSTEM, AND INFORMATION PROCESSING METHOD

(71) Applicant: NEC Corporation, Tokyo (JP)

(72) Inventors: Hayato Itsumi, Tokyo (JP); Koichi Nihei, Tokyo (JP); Yusuke Shinohara, Tokyo (JP); Takanori Iwai, Tokyo (JP); Florian Beye, Tokyo (JP); Charvi Vitthal, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 18/028,708

(22) PCT Filed: Oct. 5, 2020

(86) PCT No.: PCT/JP2020/037673
§ 371 (c)(1),
(2) Date: Mar. 27, 2023

(87) PCT Pub. No.: WO2022/074701
PCT Pub. Date: Apr. 14, 2022

(65) Prior Publication Data
US 2023/0334672 A1    Oct. 19, 2023

(51) Int. Cl.
*G06T 7/215* (2017.01)
*G06T 5/20* (2006.01)
*G06T 5/50* (2006.01)

(52) U.S. Cl.
CPC ............ *G06T 7/215* (2017.01); *G06T 5/20* (2013.01); *G06T 5/50* (2013.01); *G06T 2207/10016* (2013.01); *G06T 2207/30252* (2013.01)

(58) Field of Classification Search
CPC .. G06T 7/215; G06T 5/20; G06T 5/50; G06T 2207/10016; G06T 2207/30252;
(Continued)

(56) References Cited

U.S. PATENT DOCUMENTS

2010/0079590 A1* 4/2010 Kuehnle ............... G06V 20/588
340/436
2017/0124405 A1* 5/2017 Gupta .................... G06V 20/64
(Continued)

FOREIGN PATENT DOCUMENTS

JP    2005-141517 A    6/2005
JP    2011-118889 A    6/2011
(Continued)

OTHER PUBLICATIONS

International Search Report for PCT Application No. PCT/JP2020/037673, mailed on Dec. 15, 2020.
(Continued)

*Primary Examiner* — Jose L Couso
(74) *Attorney, Agent, or Firm* — Sughrue Mion, PLLC

(57) ABSTRACT

A region prediction unit predicts the target region in the second image frame based on the target region detected in a first image frame and a time interval between the first and second image frames. The region prediction unit predicts the target region in the third image frame based on the target region detected in the second image frame and a time interval between the second and third image frames. A region determination unit determines, as an image-processing region, a region obtained by adding a margin to the target prediction region in the third image frame in accordance with an overlapping portion between the detected target region in the second image frame and the prediction region in the second image frame.

17 Claims, 12 Drawing Sheets

(58) Field of Classification Search
CPC . G06T 7/246; G06T 7/60; G06T 2207/30232;
G06T 2207/30236; G06T 2207/30241;
G06T 2207/30256; G06T 2207/30261;
G06T 2207/30264; G06T 2210/21; G06V
20/56; G06V 10/25; G06V 20/46; G06V
20/58; G06V 20/588; G08G 1/09623;
G08G 1/164; G08G 1/165; G08G 1/166;
G08G 1/20; G08G 1/00; G08G 1/0112;
G08G 1/16; G08G 1/167; H04N 23/00;
B60R 21/00
See application file for complete search history.

(56) References Cited

U.S. PATENT DOCUMENTS

2018/0345958 A1* 12/2018 Lo ................... G08G 1/096725
2020/0250836 A1* 8/2020 Li ............................ G06T 5/30
2021/0133947 A1* 5/2021 Li .......................... G01S 17/931
2021/0350145 A1* 11/2021 Park ....................... G06T 7/246
2022/0076037 A1* 3/2022 Hochman .............. G05D 1/249

FOREIGN PATENT DOCUMENTS

| JP | 2015-115760 A | 6/2015 | |
| JP | 2015195018 A * | 11/2015 | ......... G06K 9/00805 |
| JP | 2016-181072 A | 10/2016 | |
| JP | 2017-062638 A | 3/2017 | |
| JP | 2017-194787 A | 10/2017 | |
| JP | 2019-125894 A | 7/2019 | |

OTHER PUBLICATIONS

JP Office Action for JP Application No. 2022-554977, mailed on Apr. 16, 2024 with English Translation.

* cited by examiner

INFORMATION PROCESSING DEVICE, INFORMATION PROCESSING SYSTEM, AND INFORMATION PROCESSING METHOD

This application is a National Stage Entry of PCT/JP2020/037673 filed on Oct. 5, 2020, the contents of all of which are incorporated herein by reference, in their entirety.

TECHNICAL FIELD

The present disclosure relates to an information processing device, an information processing system, and an information processing method.

BACKGROUND ART

In vehicle control technologies, methods of providing necessary information by improving quality of only camera images and regions important for driving are expected.

For example, Patent Literature 1 discloses an in-vehicle image processing device that performs image processing on an image signal output from an imaging device that captures a side to the rear of a vehicle. Patent Literature 1 also discloses that, in order to ensure visibility of a target to a driver, a width of a margin M1 is set to be wide with respect to a rectangular region R1 set in a target at a short distance from the vehicle, and a width of a margin M2 is set to be narrow with respect to a rectangular region R2 set in the target at a long distance.

CITATION LIST

Patent Literature

Patent Literature 1: Japanese Unexamined Patent Application Publication No. 2019-125894

SUMMARY OF INVENTION

Technical Problem

However, in Patent Literature 1, image processing in which a margin is set according to a target imaged at time t is performed. Therefore, when the image processing is performed on a target region including a margin identified as in Patent Literature 1 at time t+1, the region subjected to the image processing may deviate from the target region in a case where the target is moving.

The present invention has been made to solve such a problem, and an object of the present invention is to provide an information processing device, an information processing system, an information processing method, a program, and the like capable of predicting movement of a target and determining a region to be subjected to image processing.

Solution to Problem

According to a first aspect of the present disclosure, an information processing device includes:
an image acquisition unit configured to acquire a first image frame, a second image frame subsequent to the first image frame, and a third image frame subsequent to the second image frame, which are captured by an imaging unit mounted on a vehicle;
a target detection unit configured to detect a target region including a target in the image frame;
a region prediction unit configured to predict a region of the target in the second image frame based on the region of the target detected in the first image frame and a time interval between the first and second image frames, and predicts the region of the target in the third image frame based on the region of the target detected in the second image frame and a time interval between the second and third image frames; and
a region determination unit configured to determine, as an image-processing region, a region obtained by adding a margin to the prediction region of the target in the third image frame in accordance with an overlapping portion between the target region in the second image frame and the prediction region in the second image frame.

According to a second aspect of the present disclosure, an information processing system includes:
an image acquisition unit configured to acquire a first image frame, a second image frame subsequent to the first image frame, and a third image frame subsequent to the second image frame, which are captured by an imaging unit mounted on a vehicle;
a target detection unit configured to detect a target region including a target in the image frame;
a region prediction unit configured to predict a region of the target in the second image frame based on the region of the target detected in the first image frame and a time interval between the first and second image frames, and predict the region of the target in the third image frame based on the region of the target detected in the second image frame and a time interval between the second and third image frames; and
a region determination unit configured to determine, as an image-processing region, a region obtained by adding a margin to the prediction region of the target in the third image frame in accordance with an overlapping portion between the target region in the second image frame and the prediction region in the second image frame.

According to a third aspect of the present disclosure, an information processing method includes:
acquiring a first image frame, a second image frame subsequent to the first image frame, and a third image frame subsequent to the second image frame, which are captured by an imaging unit mounted on a vehicle;
detecting a target region including a target in the image frame;
predicting a region of the target in the second image frame based on the region of the target detected in the first image frame and a time interval between the first and second image frames, and predicting the region of the target in the third image frame based on the region of the target detected in the second image frame and a time interval between the second and third image frames; and
determining, as an image-processing region, a region obtained by adding a margin to the prediction region of the target in the third image frame in accordance with an overlapping portion between the target region in the second image frame and the prediction region in the second image frame.

Advantageous Effects of Invention

According to the present disclosure, it is possible to predict movement of a target and determine a region to be subjected to image processing.

EXAMPLE EMBODIMENT

Hereinafter, specific example embodiments to which the present invention is applied will be described in detail with reference to the drawings. However, the present invention is not limited to the following example embodiments. In order to clarify description, the following description and drawings are simplified as appropriate.

First Example Embodiment

Figure 1:
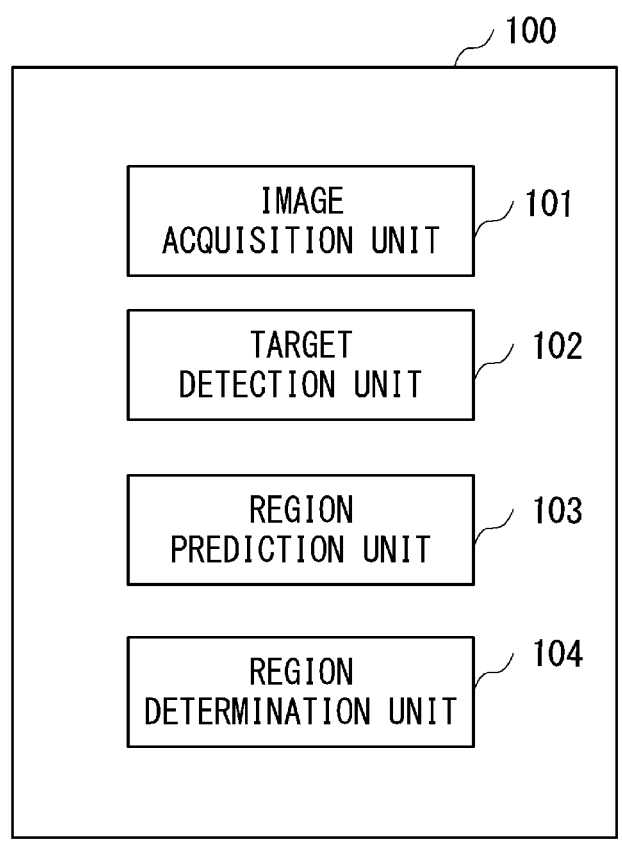
FIG. 1 is a block diagram illustrating a configuration of an information processing device according to a first example embodiment.

FIG. 1 is a block diagram illustrating a configuration of an information processing device according to a first example embodiment.

An information processing device 100 is implemented with a computer. The information processing device 100 includes an image acquisition unit 101, a target detection unit 102, a region prediction unit 103, and a region determination unit 104.

The image acquisition unit 101 acquires a first image frame, a second image frame subsequent to the first image frame, and a third image frame subsequent to the second image frame, which are captured by an imaging unit mounted on a vehicle. The first, second, and third image frames may be three image frames which are consecutive in time series or may be three non-continuous image frames in which there are other frames between the image frames. The imaging unit is, for example, a camera including an image sensor such as a CCD or a CMOS sensor, such as a digital still camera or a digital video camera, and captures and outputs an image as an electrical signal.

The target detection unit 102 detects a target region including a target in an image frame. The target may affect driving of a vehicle. The target includes, for example, a vehicle, a bicycle, a pedestrian, a traffic sign, and a traffic light. The target may be a moving target or a stationary target.

The region prediction unit 103 predicts a target region in the second image frame based on the target region detected in the first image frame and a time interval between the first and second image frames. When the target region is used in the present specification, the target region may include a location of a target in an image and a size of the target. Further, the region prediction unit 103 predicts the target region in the third image frame based on the target region detected in the second image frame and a time interval between the second and third image frames. The region prediction unit 103 can predict a position of a target using a Kalman filter.

The region determination unit 104 determines, as an image-processing region, a region obtained by adding a margin to the prediction region of the target in the third image frame according to an overlapping portion between the target region detected in the second image frame and the prediction region in the second image frame. For example, when the overlapping portion is equal to or less than a threshold, the region determination unit 104 enlarges the margin.

Figure 2:
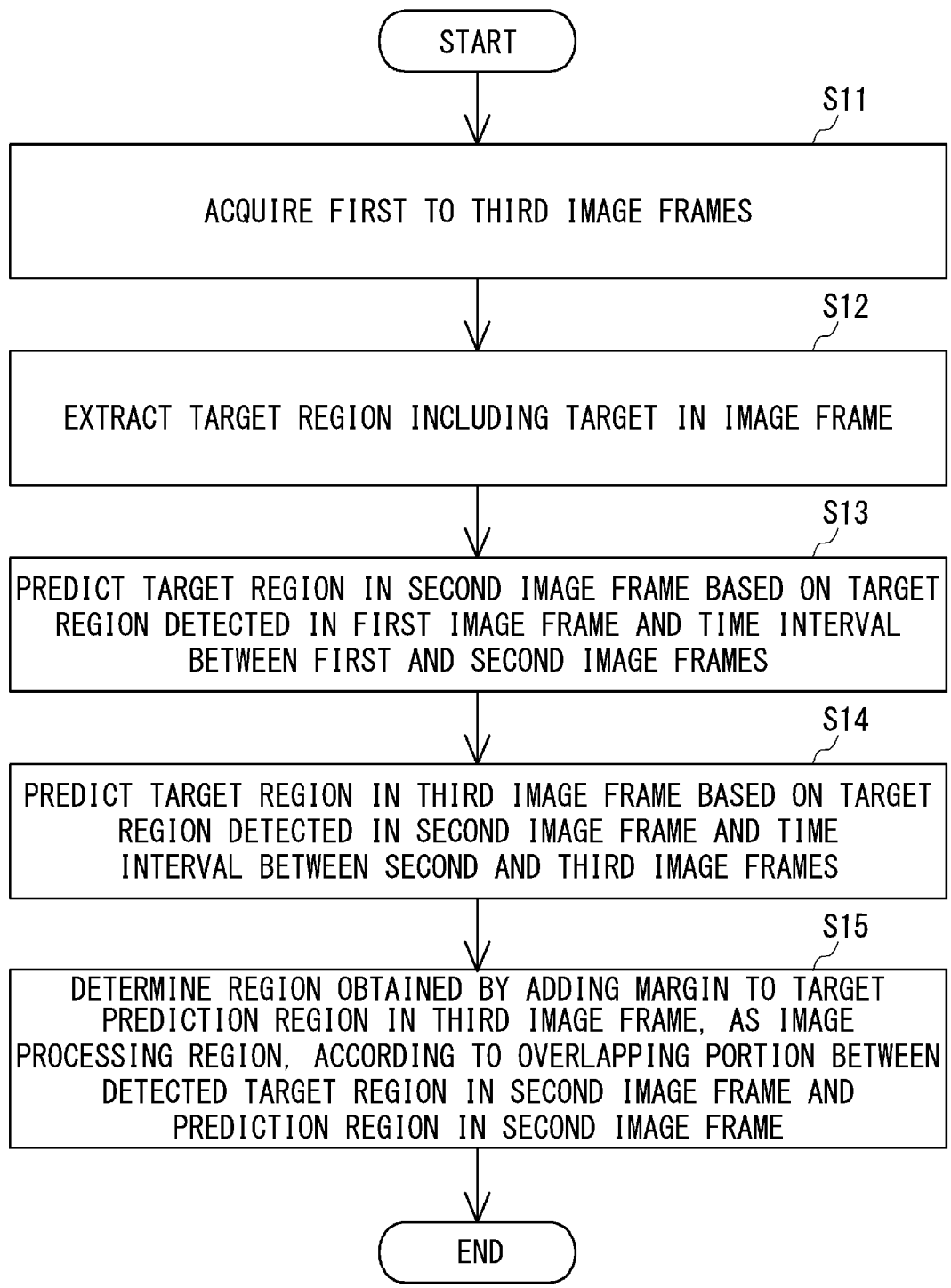
FIG. 2 is a flowchart illustrating an information processing method according to the first example embodiment.

FIG. 2 is a flowchart illustrating an information processing method according to the first example embodiment.

The first image frame captured by an imaging unit mounted on the vehicle, the second image frame subsequent to the first image frame, and the third image frame subsequent to the second image frame are acquired (step S11). A target region including a target in each image frame is detected (step S12). The target region in the second image frame is predicted based on the target region detected in the first image frame and the time interval between the first and second image frames (step S13). The target region in the third image frame is predicted based on the target region detected in the second image frame and the time interval between the second and third image frames (step S14). A region obtained by adding a margin to the target prediction region in the third image frame is determined as an image-processing region according to an overlapping portion between the detected target region in the second image frame and the prediction region in the second image frame (step S15).

According to the above-described present example embodiment, movement of the target can be predicted, and the region to be subjected to image processing can be appropriately determined.

Other Example Embodiments

Figure 3:
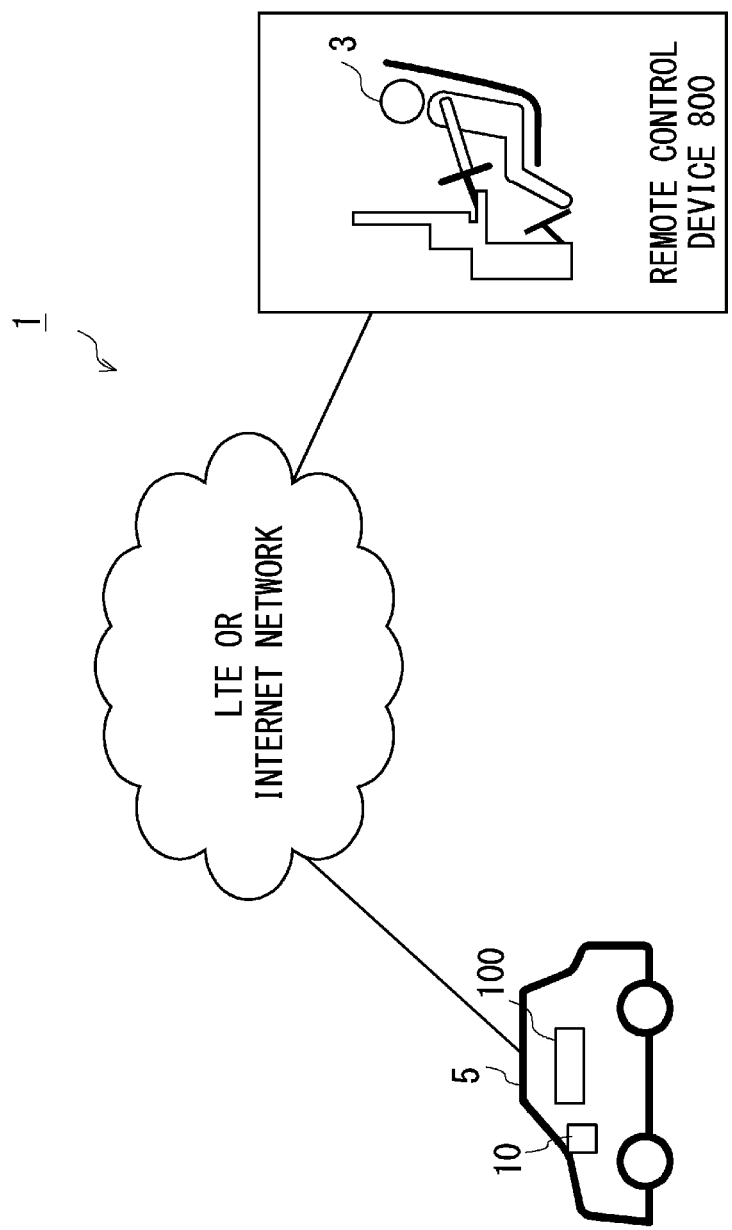
FIG. 3 is a block diagram illustrating a configuration of an information processing system according to several example embodiments.

FIG. 3 is a block diagram illustrating a configuration example of an information processing system according to several example embodiments.

The information processing system 1 includes a remote control device 800 and the information processing device 100. In the information processing system 100, the remote control device 800 and the information processing device 100 communicate with each other through a network. The network may be, for example, a network in conformity with a communication line standard such as Long Term Evolution (LTE) or may include a radio communication network such as Wi-Fi (Registered Trademark) or a 5th-generation mobile communication system.

Figure 8:
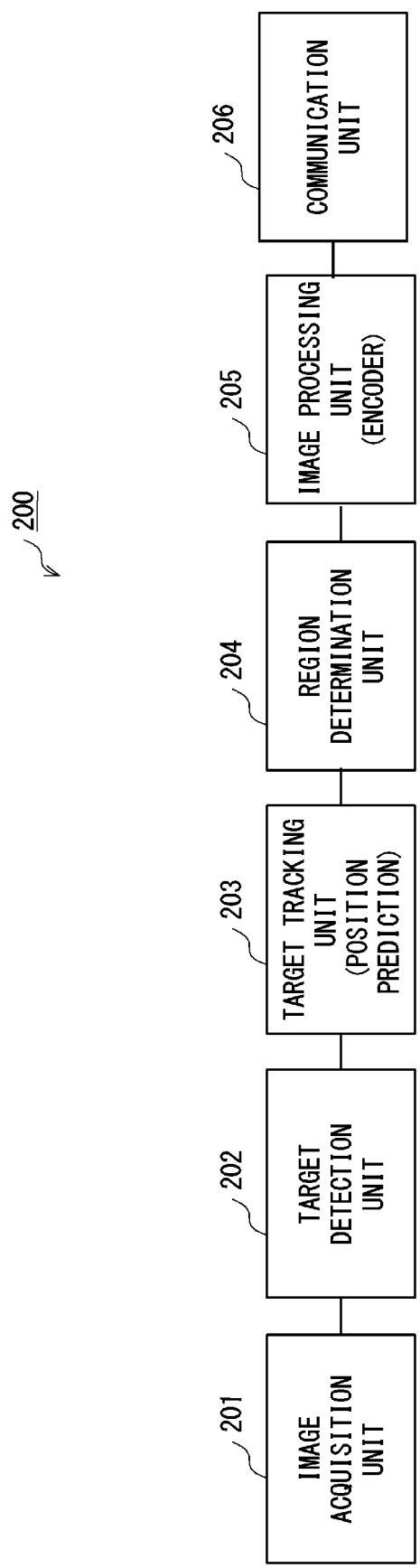
FIG. 8 is a block diagram illustrating a configuration of an image processing device according to a second example embodiment.

The information processing device 100 includes an image acquisition unit 101 that acquires the first image frame captured by the imaging unit 10 mounted on the vehicle 5, the second image frame subsequent to the first image frame, and the third image frame subsequent to the second image frame, and a target detection unit 102 that detects a target region including a target in the image frames. Further, the information processing device 100 includes the region prediction unit 103 that predicts the target region in the second image frame based on the target region detected in the first image frame and the time interval between the first and second image frames, and predicts the target region in the third image frame based on the target region detected in the second image frame and the time interval between the second and third image frames. Further, the information processing device 100 includes the region determination unit 104 that determines a region obtained by adding a margin to the target prediction region in the third image frame as an image-processing region based on an overlapping portion between the target region in the second image frame and the prediction region in the second image frame. Further, as illustrated in FIG. 8, the information processing device 100 can include an image processing unit 205 that performs image processing so that the determined region has higher image quality than other regions, and a communication unit 206 that transmits image data subjected to image processing to the remote monitoring device 800.

In FIG. 3, the image acquisition unit 101, the target detection unit 102, the region prediction unit 103, and the region determination unit 104 mounted in the information processing device 100 have been described, but may be mounted on different devices to be implemented as a system. For example, a device on which the image acquisition unit 101 and the target detection unit 102 are mounted and a device on which the region prediction unit 103 and the region determination unit 104 are mounted may communicate with each other via a network.

The information processing system 1 according to another example embodiment can predict movement of a target and appropriately determine a region to be subjected to image processing. Further, the information processing system 1 can transmit image data in which a region necessary for driving a vehicle has high image quality while reducing a use bandwidth.

Second Example Embodiment

Figure 4:
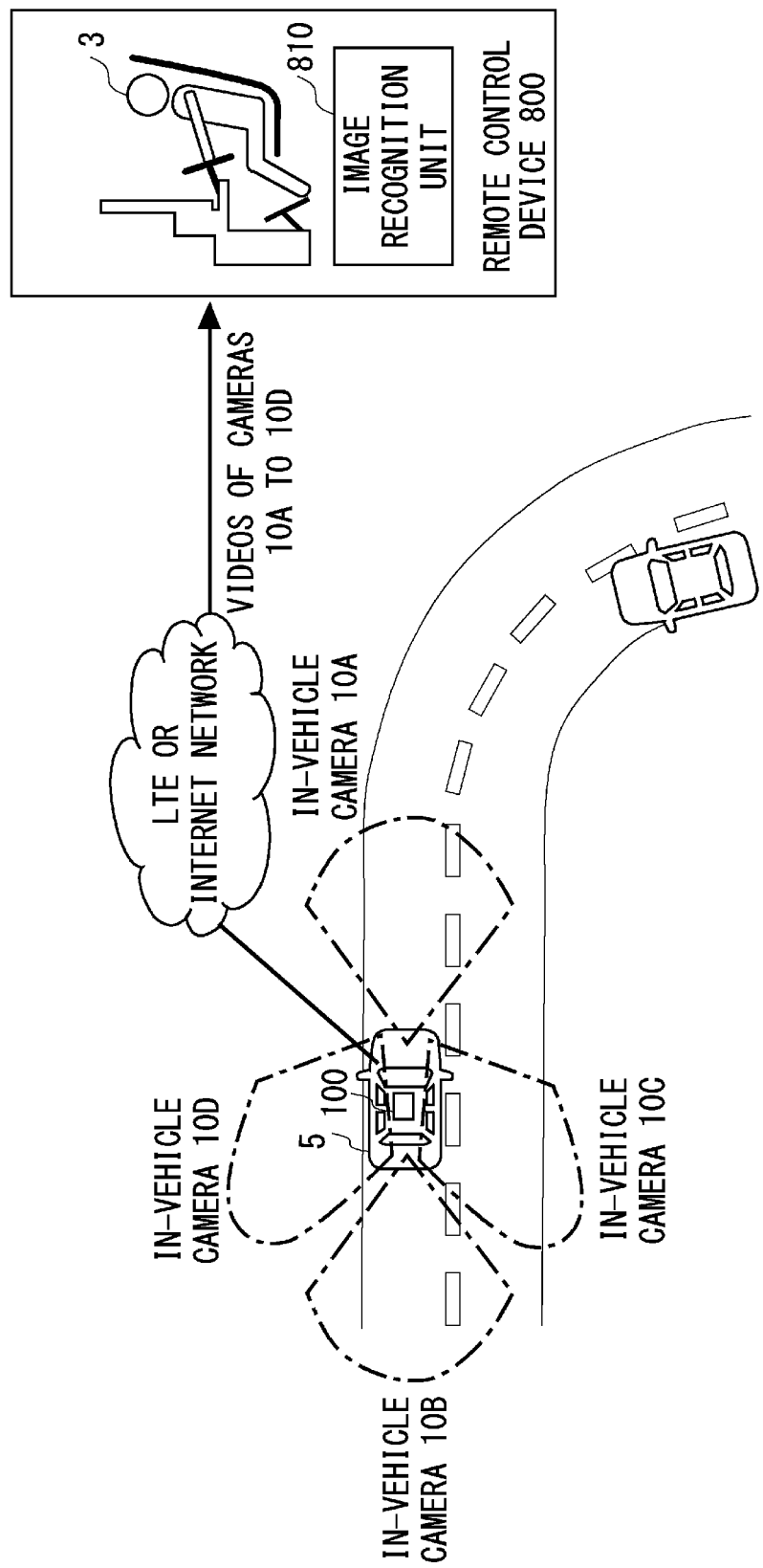
FIG. 4 is a schematic diagram illustrating an overview of a remote monitoring operation system.

FIG. 4 is a schematic diagram illustrating an overview of the remote monitoring operation system.

The remote monitoring operation system remotely operates a vehicle 5 for which a driver is not required from the remote monitoring center. As a method of remotely operating the unmanned driving vehicle 5, videos captured by a plurality of in-vehicle cameras 10A to 10D mounted on the vehicle 5 are transmitted to a remote monitoring control device (also simply referred to as a remote control device 800) via a wireless communication network and the Internet. The image processing device 200 mounted on the vehicle performs predetermined image processing on the videos from the in-vehicle cameras, and is used to transmit the video after the image processing to the remote control device 800 via the network. The remote driver 3 remotely operates the vehicle 5 while viewing the received image on the monitor. The remote operation control device mounted on the vehicle 5 performs bidirectional communication with the remote control device 800 using a communication method (for example, LTE or 5G) using a mobile phone network. An image recognition unit 810 of the remote control device 800 can analyze the received video or image and detect and recognize a target using an image recognition engine. The remote control device 800 may display information for the remote driver 3 to remotely operate the vehicle 5 in addition to the received video. For example, the remote control device 800 may display a received video and an analysis result to the remote driver 3. When a danger of a vehicle is sensed, the remote monitoring operation system may perform switching to remote control or automatic control while the vehicle under remote monitoring is traveling. That is, a vehicle driven by a person may be temporarily switched to such control, or a driver may be seated in the vehicle.

The in-vehicle camera 10A images in front of the vehicle, the in-vehicle camera 10B images to the rear of the vehicle, the in-vehicle camera 10C images to the right side of the vehicle, and the in-vehicle camera 10D images to the left side of the vehicle. The number of in-vehicle cameras is not limited thereto and may be five or more. The performance of each camera is basically the same, but may be slightly different. A normal driver of a taxi or the like is required to have a second type license and is required to be able to recognize a target (also referred to as an object) in a range visible to a person with eyesight of 0.8 or more. Therefore, a video supplied to a remote driver may also be a video in which a target in a range that a person with eyesight of 0.8 or more can see can be recognized (for example, in the case of a road sign of a general road, the driver can recognize a sign at a distance of 10.66 m). The remote driver is required to visually recognize not only a target but also surrounding information of the target, and such surrounding information can also be transmitted to the remote driver as a relatively high-quality video.

In vehicle remote monitoring and control via a mobile phone network, an available bandwidth fluctuates, and therefore there is a concern of video quality deteriorating due to a lack of a band. Therefore, when a bandwidth decreases, only an important region of a captured image is sent with high quality, and the other regions are sent with low image quality to the remote monitoring center, and thus accuracy of video analysis in the remote monitoring center can be maintained. In this way, it is possible to maintain quality of experience (QoE) when the band decreases.

Figure 5:
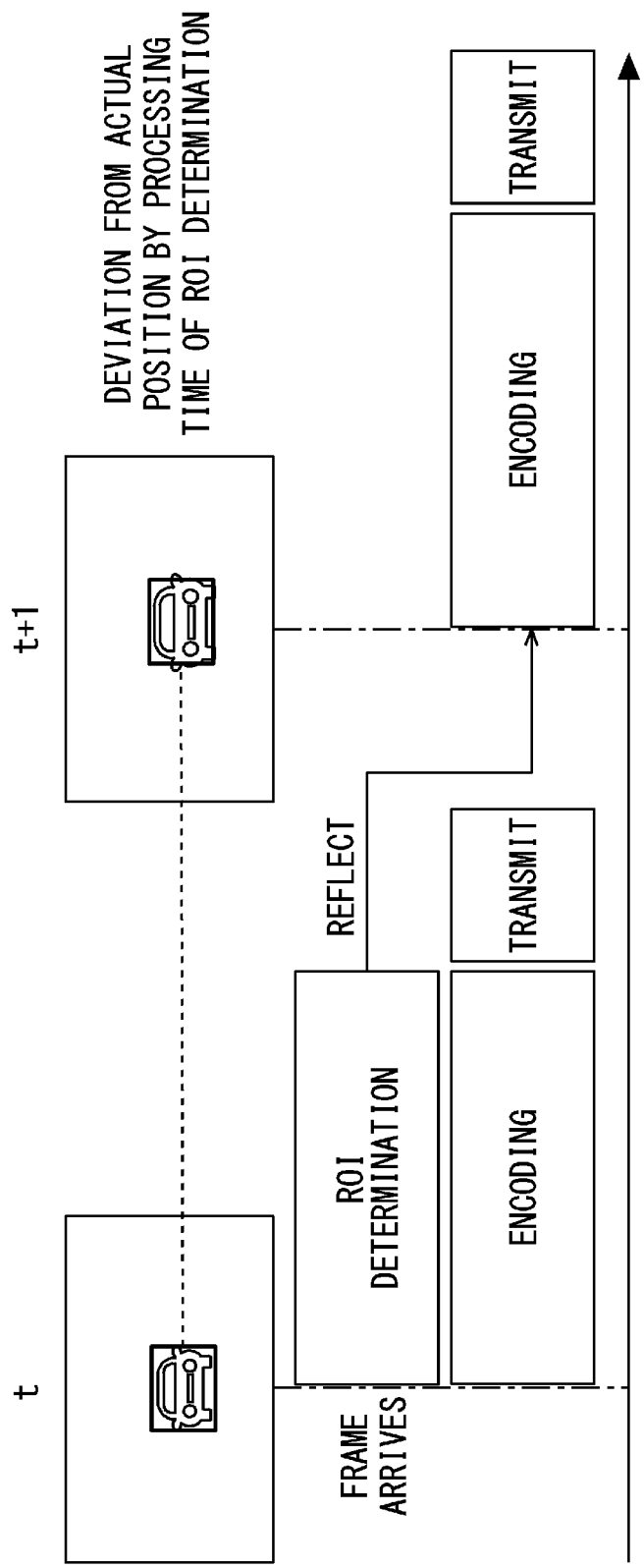
FIG. 5 is a diagram illustrating a procedure of ROI determination according to a comparative example and deviation between the determined ROI and an actual position in a video.

FIG. 5 is a diagram illustrating a difference between the determined ROI and an actual position in the image.

A region of interest (ROI) is a region important for driving a vehicle and is a region with high image quality provided to a remote driver. A video captured by the imaging unit is transmitted as a still image to the image processing device 200 at a predetermined frame rate (frames per second (FPS)). When a ROI determination process and encoding process are performed sequentially, a delay of several hundred milliseconds occurs in sending of an image frame to the remote monitoring center. Accordingly, in order to reduce the delay, as illustrated in FIG. 4, the ROI determination process and encoding process are performed in parallel. The encoded image data is immediately transmitted to the remote monitoring center. The ROI determined in the image frame at time t is reflected in the encoding at time t+1. Due to the movement of the target (for example, a vehicle) during the processing time of the ROI determination, a deviation occurs between the determined position of the ROI and an actual position of the target. As a result, the image processing is performed on the ROI deviated from an actual target, and the image data after the image processing is transmitted to the remote monitoring center. Therefore, recognition accuracy on the remote monitoring center side may deteriorate.

Figure 6:
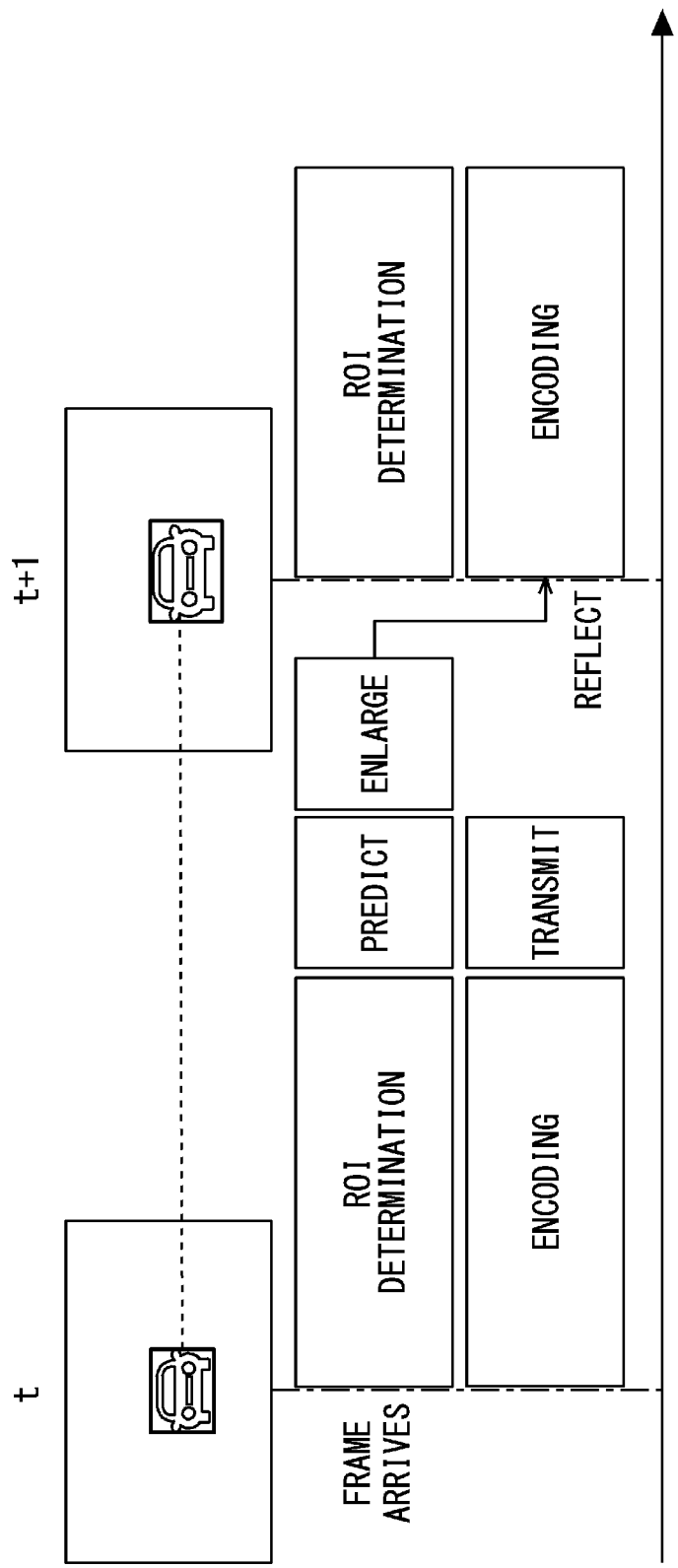
FIG. 6 is a diagram illustrating a procedure of the ROI determination based on movement prediction of a target according to a second example embodiment.

FIG. 6 is a diagram illustrating a procedure of the ROI determination based on movement prediction of a target according to the second example embodiment. In the second example embodiment, a movement prediction process and an ROI region enlargement process for the target are added after the ROI determination process. That is, the movement of the target is predicted, and the ROI is expanded based on the prediction result. As a result, a problem of degradation of recognition accuracy due to positional deviation between the target and the ROI when the ROI determination process and the encoding process are performed in parallel is addressed.

Figure 7:
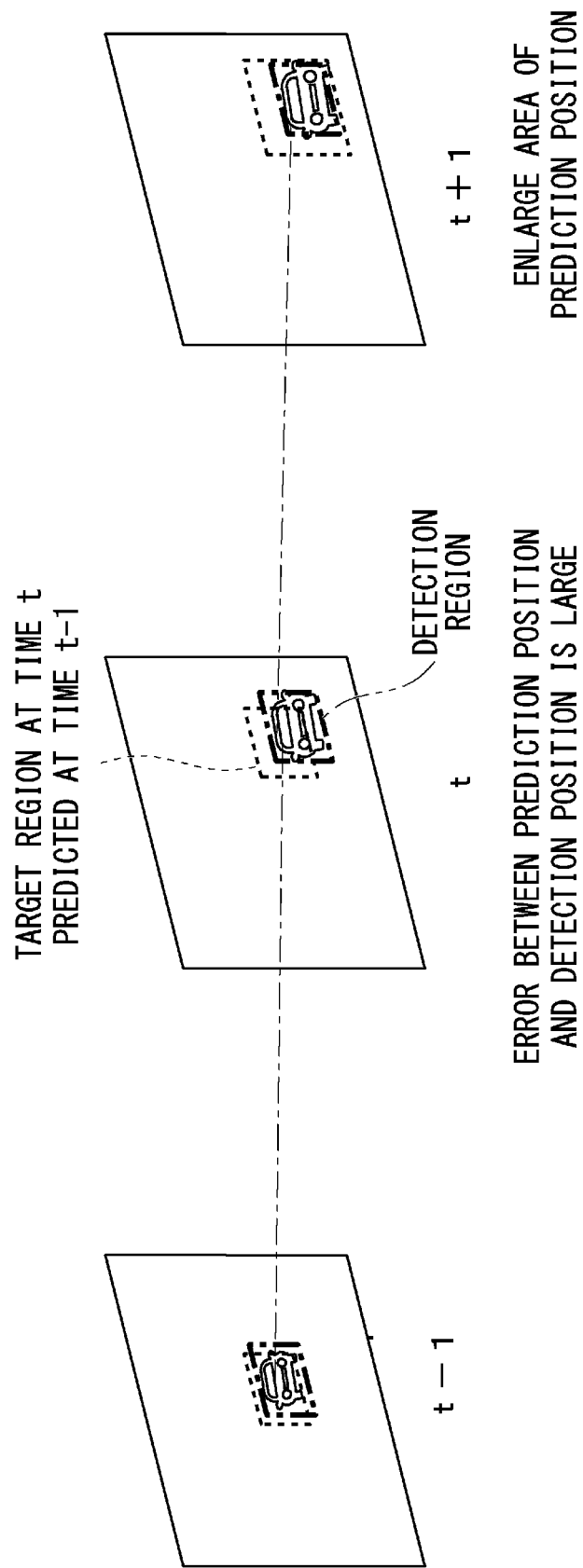
FIG. 7 is a diagram illustrating a problem of target movement prediction and a solution thereto.

FIG. 7 is a diagram illustrating a problem of target movement prediction and a solution thereto.

If the movement prediction of the target is completely accurate, the predicted region of the target may be the ROI. However, in many cases, a movement prediction position of the target may deviate from a detection position of the target due to uncertainty of prediction such as a case where the movement pattern of the target is complicated. In FIG. 6, the prediction region of the target at time t predicted based on the image frame at time t−1 (indicated by a dotted rectangle in FIG. 6) deviates from the detection region of the target at time t (indicated by a square indicated by a one-dot chain line in FIG. 6). Therefore, when the overlapping portion between the detection region and the prediction region is equal to or less than a threshold at the time t (that is, when the uncertainty of the prediction is large), it is considered that a prediction error is large, and the ROI is determined in the region obtained by adding the margin to the prediction region at the time t+1. The margin may be set step by step such that the margin increases as the overlapping portion between the detection region and the prediction region decreases.

In the example of FIG. 7, a plurality of image frames (t−1, t, t+1) that continue in time series is illustrated, but the present disclosure is not limited thereto. The present invention can also be applied to a plurality of image frames (t−3, t, t+3) that are not continuous in time series. For example, the prediction region of the detection target in the image frame (t) may be estimated using the image frame (t−3) including the detection target. Further, the margin of the prediction region of the image frame (t+3) may be determined based on the overlapping portion between the target prediction region and the target detection region (detection result) in the image frame (t).

FIG. 8 is a block diagram illustrating a configuration of an image processing device according to a second example embodiment.

The image processing device 200 includes an image acquisition unit 201, a target detection unit 202, a target tracking unit 203, a region determination unit 204, an image processing unit 205, and a communication unit 206.

The image acquisition unit 201 acquires an image captured by an imaging unit mounted on the vehicle. The image acquisition unit 201 sequentially acquires a plurality of image frames obtained by continuously photographing a subject at a predetermined frame rate (FPS) by the imaging unit mounted on the vehicle. The image acquisition unit 201 is connected to the imaging unit (for example, an in-vehicle camera) via a network. The imaging unit is, for example, a camera including an image sensor such as a CCD or a CMOS sensor, such as a digital still camera or a digital video camera, and captures and outputs an image as an electrical signal.

The target detection unit 202 detects one or more targets in the acquired images. The target detection unit 202 sequentially detects the targets in image frames sequentially transmitted from the image acquisition unit. For example, the target detection unit 202 detects one or more targets in the images by setting in advance the targets that may affect driving of the vehicle. For example, a person, a vehicle, a motorcycle, a bicycle, a truck, a bus, and the like can be set as targets that may affect driving of the vehicle. The target detection unit 202 can also identify the types of targets (for example, a person, a vehicle, a bicycle, a motorcycle, and the like) using a known image recognition technology.

The target tracking unit 203 predicts positions of the targets in specific image frames with reference to the sequentially transmitted past image frames. The target tracking unit 203 can track the targets using, for example, a Kalman filter. The target tracking unit 203 predicts a position (target region) of a target in a specific image frame based on the detection position in the past image frame and the time interval between the past image frame and the specific image frame. The past image frame and the specific image frame may be two image frames that are consecutive in time series, or may be two image frames that are not consecutive in time series.

The region determination unit 204 determines the margin of the target prediction region in the specific image frame based on the overlapping portion between the target region in the past image frame and the prediction region in the past image frame. The region determination unit 204 determines a region obtained by adding a margin to the prediction region as an image-processing region for improving high image quality. The region determination unit 204 may also be referred to as an ROI determination unit or an ROI margin determination unit in order to determine an ROI (high image quality region) including a margin.

The image processing unit 205 (also simply referred to as an encoder in some cases) performs image processing to improve the image quality of the region determined by the region determination unit 204 and to reduce the image quality of other regions in the image frame. The image quality improvement process is a compression process at a lower compression rate than the region with the reduced image quality. The image quality reduction process may include a contrast reduction process, a resolution reduction process, a number-of-gradations reduction process, a color number reduction process, or a dynamic range reduction process. The image quality improvement process may also include a contrast reduction process, a resolution reduction process, a number-of-gradations reduction process, a number-of-colors reduction process, or a dynamic range reduction process, but is various types of image processing in which the image quality is higher than that in the image quality reduction process.

The communication unit 206 is a communication interface with the network. The communication unit 206 is used to communicate with other network node devices (for example, the information processing device on the remote monitoring center side) included in the image processing system. The communication unit 206 may be used to perform wireless communication. For example, the communication unit 206 may be used to perform wireless LAN communication defined in IEEE 802.11 series or mobile communication defined in 3rd Generation Partnership Project (3GPP), 4G, 5G, or the like. The communication unit 206 can also be connected to be able to communicate with a smartphone via Bluetooth (registered trademark) or the like. The communication unit 206 can be connected to the camera via a network.

The communication unit 206 transmits the data of the encoded image frame to the remote monitoring center. The communication unit 206 wirelessly transmits the encoded image data to the remote control device 800 via a mobile network such as LTE or 5G.

In FIG. 8, the image acquisition unit 201, the target detection unit 202, the target tracking unit 203, the region determination unit 204, and the image processing unit 205 mounted in the image processing device 200 have been described, but may be mounted in different devices. For example, a device capable of performing network reforming communication may be a device on which the image acquisition unit 201, the target detection unit 202, the target tracking unit 203, and the region determination unit 204 are mounted and the image acquisition unit 205 that acquires the region information determined by the region determination unit 204 and performs image processing is mounted.

A method of determining the ROI to which the margin is added based on the target prediction will be described with reference to FIGS. 9 to 11.

Figure 9:
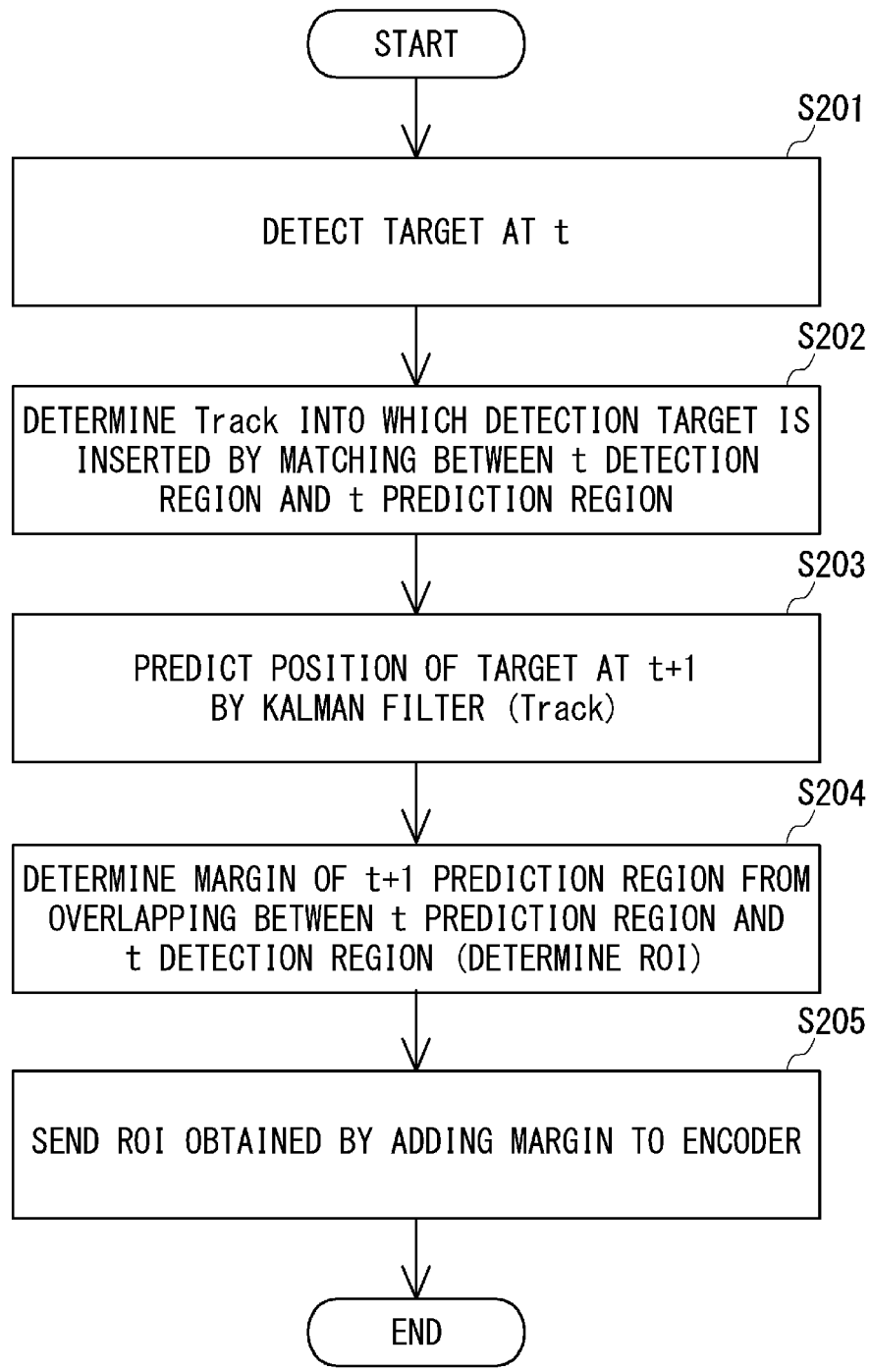
FIG. 9 is a flowchart illustrating a method of determining an ROI to which a margin is added based on target prediction according to the second example embodiment.
Figure 10:
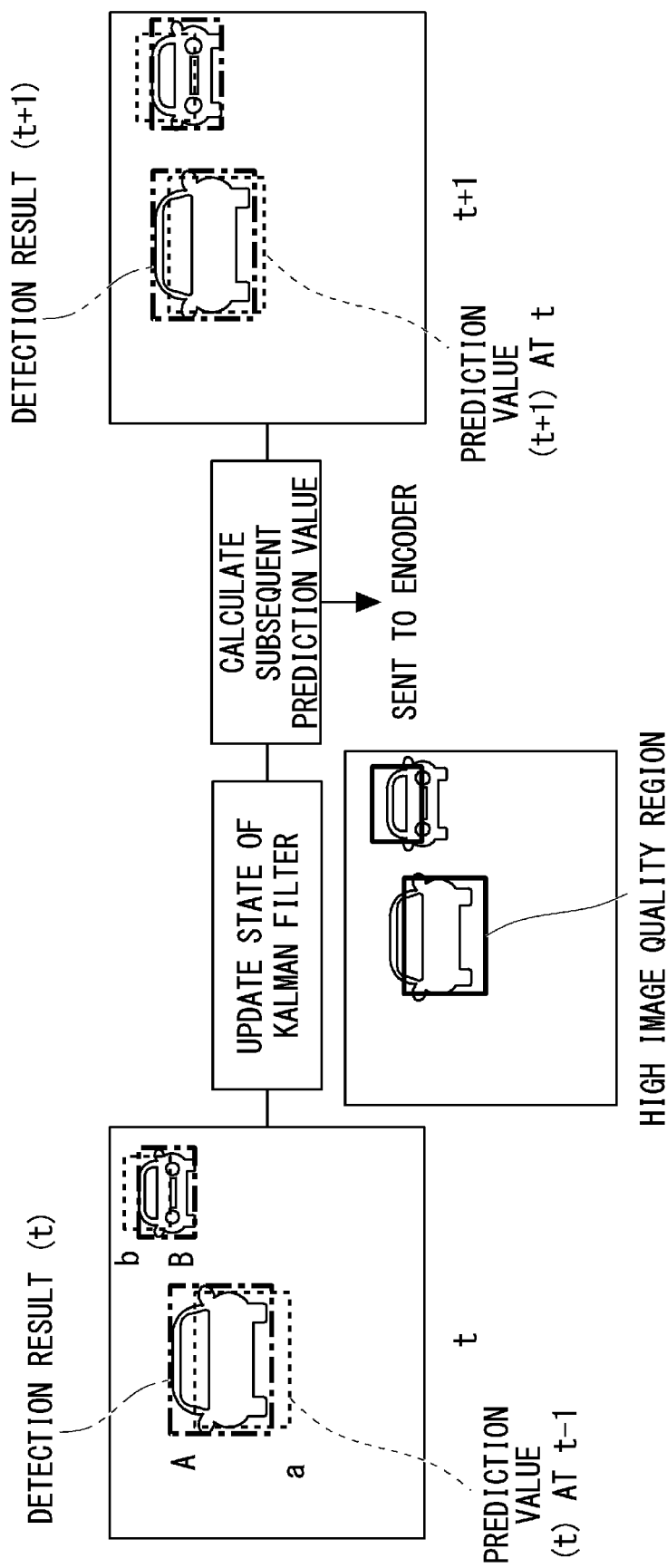
FIG. 10 is a diagram illustrating a method of predicting a target region using a Kalman filter.

FIG. 9 is a flowchart illustrating a method of determining an ROI to which a margin is added.

Target detection unit 202 detects a target region including the target at time t (step S201). A target region at the time t is referred to as a t detection region. A region including a predicted target at the time t is referred to as a t prediction region. Subsequently, it is determined a track into which the detection target is to be inserted (step S202). FIG. 10 is a diagram illustrating a method of predicting the position of the target using the Kalman filter. FIG. 10 also illustrates determination of a prediction region (ROI) according to a comparative example. The target tracking unit 203 matches a detection result {A, B} with a prediction value {a, b}, and regards a pair in which overlapping is large as a pair. As illustrated in FIG. 10, since the detection region (detection result) A and the prediction region a have large overlapping, these regions are regarded as a pair. Since the detection region (detection result) B and the prediction region b have large overlapping, these regions are regarded as a pair. The target tracking unit 203 updates a state space model by adding the detection region A as an observation value of the Kalman filter predicting the prediction region a. Similarly, the target tracking unit 203 updates the state space model by adding the detection region B as an observation value of the Kalman filter predicting the prediction region b.

Subsequently, the target tracking unit 203 predicts the position of the target at the time t+1 using the Kalman filter updated in step S202 (step S203). In the comparative example, the prediction position (prediction region) at t+1 is sent as the ROI to the encoder. As described above, the prediction region and the target region are likely to deviate due to the uncertainty of the prediction. As a result, the encoder performs image processing to improve image quality of the deviating ROI have and to reduce image quality of the other regions, and thus there is a problem that recognition accuracy of the target in the image after the image processing deteriorates.

Accordingly, in the present example embodiment, a margin is determined from the overlapping between the detection region (the detection result) and the prediction region, and a region obtained by adding the determined margin to the prediction region is set as an ROI (high image quality region).

The region determination unit 204 determines the margin of the t+1 prediction region from the overlapping between the t prediction region and the t detection region (step S204). The ROI (image quality improvement region) is determined by adding the determined margin to the t+1 prediction region.

Figure 11:
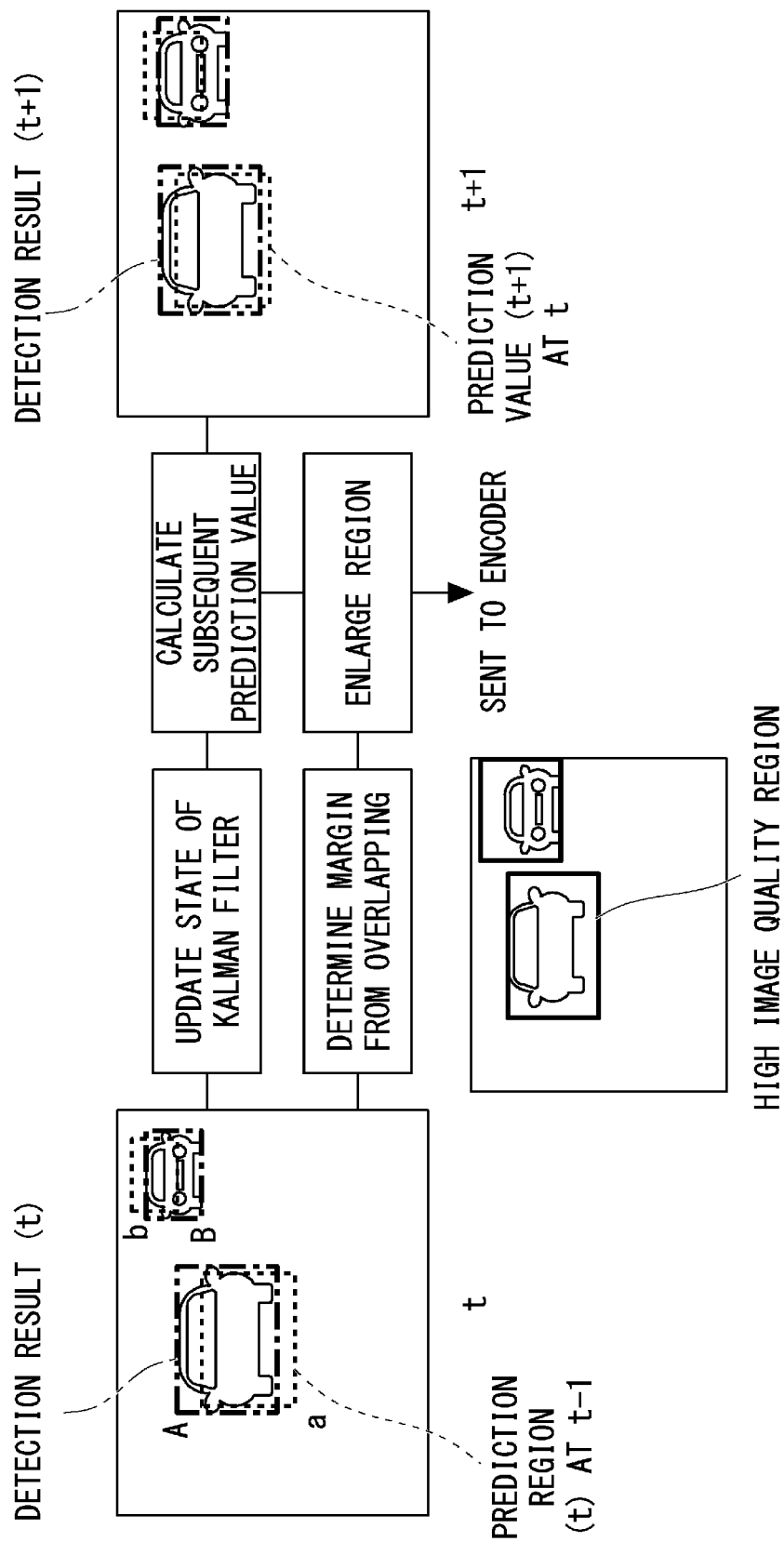
FIG. 11 is a diagram illustrating a method of determining an ROI to which a margin is added according to the second example embodiment.

FIG. 11 is a diagram illustrating a method of determining an ROI to which a margin is added according to the second example embodiment. The region determination unit 204 updates the state of the Kalman filter similarly to the comparative example. The target tracking unit 203 predicts the position (target region) of the target at the time t+1 using the updated Kalman filter. Further, the region determination unit 204 determines the margin of the t+1 prediction region to deal with the above-described uncertainty of the prediction. This margin is determined based on the detection result (detection region) at time t and the overlapping with the prediction region at time t based on the detection result at time t−1 and the time interval between the image frames. When the overlapping is equal to or less than a threshold (that is, when the uncertainty of the prediction is large), the region determination unit 204 enlarges the margin of the target prediction region. For example, the margin is determined such that a vertical length of the prediction region is enlarged by a predetermined ratio (for example, 10%) and a horizontal length of the prediction region is enlarged by a predetermined ratio (for example, 10%). The region determination unit 204 determines a region obtained by adding the margin determined in this way to the prediction region as the ROI region (for example, a high image quality region). The determined ROI region is sent to the encoder.

The encoder encodes the image data to improve the image quality of the ROI and reduce the image quality of the other regions. The communication unit 206 transmits the encoded image data to the remote control device 800.

The image processing device according to the above-described example embodiment can predict movement of the target, set the margin based on the prediction, and enlarge the image-processing region. Therefore, even when prediction uncertainty (prediction error) is large, an appropriate image-processing region can be determined so that the image recognition accuracy does not deteriorate.

In the above-described example embodiment, the remote driver 3 remotely operates the unmanned driving vehicle 5 in the information processing system 1 and the remote monitoring operation system, but the present invention is not limited thereto. For example, a general control device that generally controls the unmanned driving vehicle 5 may be provided. The general control device may generate information used for the unmanned driving vehicle 5 to autonomously drive based on the information acquired from the unmanned driving vehicle 5, and the unmanned driving vehicle 5 may operate according to the information.

Figure 12:
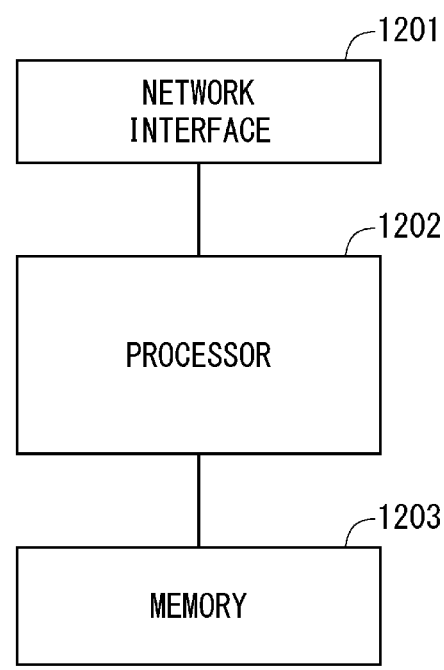
FIG. 12 is a block diagram illustrating a hardware configuration of an information processing device.

FIG. 12 is a block diagram illustrating a hardware configuration example of the information processing device 100, the image processing device 200, and the remote monitoring device 800 (hereinafter referred to as the information processing device 100 and the like). Referring to FIG. 12, the information processing device 100 and the like include a network interface 1201, a processor 1202, and a memory 1203. The network interface 1201 is used to communicate with other network node devices included in the communications system. The network interface 1201 may be used to perform wireless communications. For example, the network interface 1201 may be used to perform wireless LAN communication defined in IEEE 802.11 series or mobile communication defined in 3rd Generation Partnership Project (3GPP). Alternatively, the network interface 1201 may include, for example, a network interface card (NIC) conforming to IEEE 802.3 series.

The processor 1202 performs a process of the information processing device 100 and the like described using the flowchart or sequence in the above-described example embodiments by reading and executing software (a computer program) from the memory 1203. The processor 1202 is, for example a microprocessor, a micro processing unit (MPU), or a central processing unit (CPU). The processor 1202 may include a plurality of processors.

The memory 1203 is configured with a combination of a volatile memory (a random access memory (RAM)) and a nonvolatile memory (read only memory (ROM)). The memory 1203 may include a storage located away from the processor 1202. In this case, the processor 1202 may access the memory 1203 via an I/O interface (not illustrated). For example, the memory 1203 is not necessarily a part of a device, and may be an external storage device or a cloud storage connected to the computer device 500 via a network.

In the example of FIG. 12, the memory 1203 is used to store a software module group. The processor 1202 can perform a process of the information processing device 100 and the like described in the above-described example embodiments by reading and executing these software module groups from the memory 1203.

As described with reference to FIG. 12, each of the processors included in the information processing device 100 and the like executes one or a plurality of programs including a command group for causing a computer to perform the algorithm described with reference to the drawings.

Each of the processes described with reference to the above-described flowcharts may not necessarily be processed in time series in the procedures described as the flowcharts, and include processes executed in parallel or individually (for example, parallel processes or processes by an object). The program may be processed by one CPU, or may be processed in a distributed manner by a plurality of CPUs.

In the above-described example, the program can be stored using various types of non-transitory computer-readable media to be supplied to a computer. The non-transitory computer-readable media include various types of tangible storage media. Examples of the non-transitory computer readable media include a magnetic recording medium, a magneto-optical recording medium (for example, a magneto-optical disc), a CD-ROM (read only memory), a CD-R, a CD-R/W, and a semiconductor memory. The magnetic recording medium may be, for example, a flexible disk, a magnetic tape, or a hard disk drive. The semiconductor memory may be, for example, a mask ROM, a programmable ROM (PROM), an erasable PROM (EPROM), a flash ROM, or a random access memory (RAM). The program may be supplied to a computer by various types of transitory computer-readable media. Examples of the transitory computer-readable media include electric signals, optical signals, and electromagnetic waves. The transitory computer-readable medium can provide the program to the computer via a wired communication line such as an electric wire and optical fibers or a wireless communication line.

The present invention is not limited to the foregoing example embodiments, and can be appropriately changed without departing from the gist. The plurality of examples described above can be implemented in appropriate combination.

Some or all of the above example embodiments may be described as the following supplementary notes, but are not limited to the following.

(Supplementary Note 1)

An information processing device including:

an image acquisition unit configured to acquire a first image frame, a second image frame subsequent to the first image frame, and a third image frame subsequent to the second image frame, which are captured by an imaging unit mounted on a vehicle;

a target detection unit configured to detect a target region including a target in the image frame;

a region prediction unit configured to predict a region of the target in the second image frame based on the region of the target detected in the first image frame and a time interval between the first and second image frames, and predict the region of the target in the third image frame based on the region of the target detected in the second image frame and a time interval between the second and third image frames; and a region determination unit configured to determine, as an image-processing region, a region obtained by adding a margin to the prediction region of the target in the third image frame in accordance with an overlapping portion between the target region in the second image frame and the prediction region in the second image frame.

(Supplementary Note 2)

The information processing device according to Supplementary Note 1, in which the region determination unit enlarges the margin when the overlapping portion is equal to or less than a threshold.

(Supplementary Note 3)

The information processing device according to Supplementary Note 1 or 2, in which the region determination unit determines the region to which the margin is added as an image-processing region having a higher image quality than other regions.

(Supplementary Note 4)

The information processing device according to any one of Supplementary Notes 1 to 3, in which the margin is set step by step so that the margin increases as the overlapping portion decreases.

(Supplementary Note 5)

The information processing device according to any one of Supplementary Notes 1 to 4, in which the region prediction unit is implemented using a Kalman filter.

(Supplementary Note 6)

The information processing device according to any one of Supplementary Notes 1 to 5, in which the first, second, and third image frames are consecutive image frames.

(Supplementary Note 7)

An information processing system including:

an image acquisition unit configured to acquire a first image frame, a second image frame subsequent to the first image frame, and a third image frame subsequent to the second image frame, which are captured by an imaging unit mounted on a vehicle;

a target detection unit configured to detect a target region including a target in the image frame;

a region prediction unit configured to predict a region of the target in the second image frame based on the region of the target detected in the first image frame and a time interval between the first and second image frames, and predict the region of the target in the third image frame based on the region of the target detected in the second image frame and a time interval between the second and third image frames; and a region determination unit configured to determine, as an image-processing region, a region obtained by adding a margin to the prediction region of the target in the third image frame in accordance with an overlapping portion between the target region in the second image frame and the prediction region in the second image frame.

(Supplementary Note 8)

The information processing system according to Supplementary Note 7, in which the region determination unit enlarges the margin when the overlapping portion is equal to or less than a threshold.

(Supplementary Note 9)

The information processing system according to Supplementary Note 7 or 8, in which the region determination unit determines the region to which the margin is added as an image-processing region having a higher image quality than other regions.

(Supplementary Note 10)

The information processing system according to any one of Supplementary Notes 7 to 9, in which the margin is set step by step so that the margin increases as the overlapping portion decreases.

(Supplementary Note 11)

The information processing system according to any one of Supplementary Notes 7 to 10, in which the region prediction unit is implemented using a Kalman filter.

(Supplementary Note 12)

The information processing system according to any one of Supplementary Notes 7 to 11, further including:

an image processing unit configured to perform image processing to improve image quality of the determined region than other regions; and a communication unit configured to transmit image data subjected to the image processing to a remote monitoring device.

(Supplementary Note 13)

The information processing system according to any one of Supplementary Notes 7 to 12, in which the first, second, and third image frames are consecutive image frames.

(Supplementary Note 14)

An information processing method including:

acquiring a first image frame, a second image frame subsequent to the first image frame, and a third image frame subsequent to the second image frame, which are captured by an imaging unit mounted on a vehicle;

detecting a target region including a target in the image frame;

predicting a region of the target in the second image frame based on the region of the target detected in the first image frame and a time interval between the first and second image frames, and predicting the region of the target in the third image frame based on the region of the target detected in the second image frame and a time interval between the second and third image frames; and determining, as an image-processing region, a region obtained by adding a margin to the prediction region of the target in the third image frame in accordance with an overlapping portion between the target region in the second image frame and the prediction region in the second image frame.

(Supplementary Note 15)

The information processing method according to Supplementary Note 14, in which the margin is enlarged when the overlapping portion is equal to or less than a threshold.

(Supplementary Note 16)

The information processing method according to Supplementary Note 14 or 15, in which the region to which the margin is added is determined as an image-processing region having a higher image quality than other regions.

(Supplementary Note 17)

The information processing method according to any one of Supplementary Notes 14 to 16, in which the margin is set step by step so that the margin increases as the overlapping portion decreases.

(Supplementary Note 18)

The information processing method according to any one of Supplementary Notes 14 to 17, in which the region prediction unit is implemented using a Kalman filter.

(Supplementary Note 19)

The information processing method according to any one of Supplementary Notes 14 to 18, in which the first, second, and third image frames are consecutive image frames.

(Supplementary Note 20)

A program causing a computer to perform:

acquiring a first image frame, a second image frame subsequent to the first image frame, and a third image frame subsequent to the second image frame, which are captured by an imaging unit mounted on a vehicle;

detecting a target region including a target in the image frame;

predicting a region of the target in the second image frame based on the region of the target detected in the first image frame and a time interval between the first and second image frames, and predicting the region of the target in the third image frame based on the region of the target detected in the second image frame and a time interval between the second and third image frames; and determining, as an image-processing region, a region obtained by adding a margin to the prediction region of the target in the third image frame in accordance with an overlapping portion between the target region in the second image frame and the prediction region in the second image frame.

(Supplementary Note 21)

The program according to Supplementary Note 20, in which the computer is caused to perform enlarging the margin when the overlapping portion is equal to or less than a threshold.

(Supplementary Note 22)

The program according to Supplementary Note 20 or 21, in which the computer is caused to determine the region to which the margin is added as an image-processing region having a higher image quality than other regions.

(Supplementary Note 23)

The program according to any one of Supplementary Notes 20 to 22, in which the margin is set step by step so that the margin increases as the overlapping portion decreases.

(Supplementary Note 24)

The program according to any one of Supplementary Notes 20 to 23, in which the prediction is performed using a Kalman filter.

(Supplementary Note 25)

The program according to any one of Supplementary Notes 20 to 24, in which the first, second, and third image frames are consecutive image frames.

1 INFORMATION PROCESSING SYSTEM
3 REMOTE DRIVER
5 VEHICLE
10 IN-VEHICLE CAMERA (IMAGING UNIT)
100 INFORMATION PROCESSING DEVICE
101 IMAGE ACQUISITION UNIT
102 TARGET DETECTION UNIT
103 REGION PREDICTION UNIT
104 REGION DETERMINATION UNIT
205 IMAGE PROCESSING UNIT
200 IMAGE PROCESSING DEVICE
201 IMAGE ACQUISITION UNIT
202 TARGET DETECTION UNIT
203 TARGET TRACKING UNIT
204 REGION DETERMINATION UNIT
205 IMAGE PROCESSING UNIT (ENCODER)
206 COMMUNICATION UNIT
800 REMOTE CONTROL DEVICE
810 IMAGE RECOGNITION UNIT

What is claimed is:

1. An information processing device comprising:
   at least one memory storing instructions, and
   at least one processor configured to execute the instructions to;
   acquire a first image frame, a second image frame subsequent to the first image frame, and a third image frame subsequent to the second image frame, which are captured by an imaging unit;
   detect a target region including a target in the image frame;
   predict a region of the target in the second image frame based on the region of the target detected in the first image frame and a time interval between the first and second image frames, and predict the region of the target in the third image frame based on the region of the target detected in the second image frame and a time interval between the second and third image frames; and
   determine, as an image-processing region having a higher image quality than other regions, a region obtained by adding a margin to the prediction region of the target in the third image frame in accordance with an overlapping portion between the target region in the second image frame and the prediction region in the second image frame.

2. The information processing device according to claim 1, wherein the at least one processor configured to execute the instructions to enlarge the margin when the overlapping portion is equal to or less than a threshold.

3. The information processing device according to claim 1, wherein the margin is set step by step so that the margin increases as the overlapping portion decreases.

4. The information processing device according to claim 1, wherein the at least one processor configured to execute the instructions to implement the region prediction using a Kalman filter.

5. The information processing device according to claim 1, wherein the first, second, and third image frames are consecutive image frames.

6. An information processing system comprising:
   at least one memory storing instructions, and
   at least one processor configured to execute the instructions to;
   acquire a first image frame, a second image frame subsequent to the first image frame, and a third image frame subsequent to the second image frame, which are captured by an imaging unit;
   detect a target region including a target in the image frame;
   predict a region of the target in the second image frame based on the region of the target detected in the first image frame and a time interval between the first and second image frames, and predict the region of the target in the third image frame based on the region of the target detected in the second image frame and a time interval between the second and third image frames; and
   determine, as an image-processing region having a higher image quality than other regions, a region obtained by adding a margin to the prediction region of the target in the third image frame in accordance with an overlapping portion between the target region in the second image frame and the prediction region in the second image frame.

7. The information processing system according to claim 6, wherein the at least one processor configured to execute the instructions to enlarge the margin when the overlapping portion is equal to or less than a threshold.

8. The information processing system according to claim 6, wherein the margin is set step by step so that the margin increases as the overlapping portion decreases.

9. The information processing system according to claim 6, wherein the at least one processor configured to execute the instructions to implement the region prediction using a Kalman filter.

10. The information processing system according to claim 6, wherein the at least one processor configured to execute the instructions to perform image processing to improve image quality of the determined region than other regions; and
    transmit image data subjected to the image processing to a remote monitoring device.

11. The information processing system according to claim 6, wherein the first, second, and third image frames are consecutive image frames.

12. An information processing method comprising:
    acquiring a first image frame, a second image frame subsequent to the first image frame, and a third image frame subsequent to the second image frame, which are captured by an imaging unit;
    detecting a target region including a target in the image frame;
    predicting a region of the target in the second image frame based on the region of the target detected in the first image frame and a time interval between the first and second image frames, and predicting the region of the target in the third image frame based on the region of the target detected in the second image frame and a time interval between the second and third image frames; and
    determining, as an image-processing region having a higher image quality than other regions, a region obtained by adding a margin to the prediction region of the target in the third image frame in accordance with an overlapping portion between the target region in the second image frame and the prediction region in the second image frame.

13. The information processing method according to claim 12, wherein the margin is enlarged when the overlapping portion is equal to or less than a threshold.

14. The information processing method according to claim 12, wherein the margin is set step by step so that the margin increases as the overlapping portion decreases.

15. The information processing method according to claim 12, wherein the prediction is performed using a Kalman filter.

16. The information processing method according to claim 12, wherein the first, second, and third image frames are consecutive image frames.

17. The information processing device according to claim 1, wherein the imaging unit is mounted on a vehicle, and
wherein the at least one processor is configured to execute the instructions to transmit image data processed by image processing to other network nodes via a wireless network.

* * * * *